United States Patent
Park et al.

(10) Patent No.: US 10,254,462 B2
(45) Date of Patent: Apr. 9, 2019

(54) LIGHT SOURCE MODULE AND PLANAR LIGHT SOURCE DEVICE INCLUDING THE SAME

(71) Applicant: LG ELECTRONICS INC., Seoul (KR)

(72) Inventors: Dohan Park, Seoul (KR); Jaehyeok Kim, Seoul (KR); Eunseok Kim, Seoul (KR); Dawoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 15/177,742

(22) Filed: Jun. 9, 2016

(65) Prior Publication Data

US 2017/0045667 A1 Feb. 16, 2017

(30) Foreign Application Priority Data

Jun. 12, 2015 (KR) .......................... 10-2015-0083615

(51) Int. Cl.
*F21V 8/00* (2006.01)

(52) U.S. Cl.
CPC ......... *G02B 6/0031* (2013.01); *G02B 6/0068* (2013.01); *G02B 6/009* (2013.01)

(58) Field of Classification Search
CPC ..... G02B 6/0031; G02B 6/0068; G02B 6/009
USPC ................................. 362/609, 611, 612, 613
See application file for complete search history.

(56) References Cited

U.S. PATENT DOCUMENTS

| 9,252,348 B2* | 2/2016 | Oh .................... H01L 25/0753 |
| 2007/0171673 A1 | 7/2007 | Song et al. |
| 2007/0285944 A1* | 12/2007 | Kiyohara ............. G02B 6/0031 362/612 |
| 2008/0151141 A1* | 6/2008 | Huang ................. G02B 6/0031 349/65 |
| 2010/0134722 A1 | 6/2010 | Huang et al. |
| 2012/0147626 A1* | 6/2012 | Huang ............. G02F 1/133308 362/612 |
| 2013/0010499 A1* | 1/2013 | Que ..................... G02B 6/0085 362/631 |

(Continued)

FOREIGN PATENT DOCUMENTS

| CN | 101315489 A | 12/2008 |
| CN | 101725914 A | 6/2010 |

(Continued)

*Primary Examiner* — Karabi Guharay
*Assistant Examiner* — Glenn D Zimmerman
(74) *Attorney, Agent, or Firm* — Dentons US LLP

(57) ABSTRACT

Embodiments provide a light source module including a circuit board, at least two point light sources, which are electrically connected to the circuit board and are arranged on an upper surface of the circuit board in a longitudinal direction of the circuit board, and a light guide for guiding light, which is introduced from the point light sources, in an upward direction of the circuit board, wherein the light guide includes a first reflective wall, disposed on the upper surface of the circuit board, and a second reflective wall, disposed on the upper surface of the circuit board, such that a space, in which the point light sources are disposed, is defined between the first reflective wall and the second reflective wall. Embodiments also provide a planar light source device including the light source module.

7 Claims, 17 Drawing Sheets

(56) References Cited

U.S. PATENT DOCUMENTS

| | | | |
|---|---|---|---|
| 2013/0114020 A1* | 5/2013 | Cho | G02F 1/133615 |
| | | | 349/62 |
| 2014/0168573 A1* | 6/2014 | Park | G02B 6/009 |
| | | | 349/62 |
| 2014/0240981 A1 | 8/2014 | Weber et al. | |
| 2015/0049255 A1* | 2/2015 | Terashima | G02B 6/0085 |
| | | | 348/790 |
| 2015/0062494 A1 | 3/2015 | Park | |
| 2016/0170125 A1* | 6/2016 | Kim | G02B 6/0091 |
| | | | 362/609 |

FOREIGN PATENT DOCUMENTS

| | | |
|---|---|---|
| CN | 101832514 A | 9/2010 |
| JP | 2010272386 A | 12/2010 |
| KR | 101251840 B1 * | 4/2013 |

* cited by examiner

LIGHT SOURCE MODULE AND PLANAR LIGHT SOURCE DEVICE INCLUDING THE SAME

CROSS-REFERENCE TO RELATED APPLICATION

This application claims the priority benefit of Korean Patent Application No. 10-2015-0083615, filed on Jun. 12, 2015 in the Korean Intellectual Property Office, the disclosure of which is incorporated herein by reference.

BACKGROUND

1. Field

Embodiments relate to a light source module and a planar light source device.

2. Description of the Related Art

A representative example of light-emitting elements is Light-Emitting Diodes (LEDs), which convert electrical signals into infrared light, visible light, and the like using the characteristics of compound semiconductors. LEDs are used in, for example, home appliances, remote controllers, electronic display boards, display devices, and various automated devices. The fields in which LEDs are used are gradually becoming more numerous.

A planar light source device equipped with LEDs is a device that converts light, which is emitted from LEDs in a point light source form, into a planar light form. The planar light source device may be used in a display apparatus such as a liquid crystal display apparatus, and may be used in a variety of other lighting apparatuses.

In a conventional light guide structure, light is introduced from a light source, located at one side when viewing a cross-section of a light guide unit, into the light guide unit so as to be guided to a light emission surface or a surface opposite the light source. A light guiding means is a total reflection or light emission means based on the difference in the index of refraction, and such a means uses a pattern or shape to cause light to be emitted from the light emission surface.

FIG. 9 is a cross-sectional view of a conventional planar light source device, taken along the longitudinal direction of a light source module. Referring to FIG. 9, the conventional light source module is constructed such that packages 1300 are disposed so as to surround point light sources 1200. The packaged point light sources 1200 are arranged at a constant pitch in the longitudinal direction of a circuit board 1100.

In order to concentrate light generated from the point light sources 1200 in a desired direction, the packages 1300 are configured so as to be open at upper sides thereof over the point light sources 120 and to surround the side surfaces of the point light sources 1200.

Although the packages 1300 may concentrate light, generated from the point light sources 1200, upward (toward a light guide plate 1400), there is a problem in that the amount of light emitted in a lateral direction is reduced, thereby causing the occurrence of hot spots between the point light sources 120.

For this reason, if the pitch between the point light sources 1200 is decreased in order to diminish the hot spots, there is a problem in that manufacturing costs are increased.

FIG. 10 illustrates the travelling path of light introduced from a light source module in which the light is guided toward a light guide plate 1400 by means of a light guide 1500.

Here, the light guide 1500 is configured such that the width thereof is reduced with increasing distance toward the light guide plate 1400 from the point light sources 1200.

Consequently, there is a problem in that the light introduced from the point light sources 1200 undergoes total reflection in the light guide 1500, thereby causing internal loss of light. Furthermore, when light emitted from the light guide 1500 is introduced into the light guide plate 1400, some of the light introduced at an angle exceeding an acceptance angle (the maximum allowable incident angle within which the light emitted from the light guide plate 1400 can undergo total reflection), thereby causing radiation loss in the light guide plate 1400.

The formula for calculating the acceptance angle is as follow $$\sin \alpha = \sqrt{n_1^2 - n_2^2}$$

wherein $\alpha$ is an acceptance angle, $n_1$ is an index of refraction of a light guide plate, and $n_2$ is an index of refraction of the outside of the light guide plate.

SUMMARY

Embodiments provide a light source module and a planar light source device, which achieve enhanced light introduction efficiency.

In an embodiment, a light source module includes a circuit board, at least two point light sources, which are electrically connected to the circuit board and are arranged on an upper surface of the circuit board in a longitudinal direction of the circuit board, and a light guide for guiding light, which is introduced from the point light sources, in an upward direction of the circuit board, wherein the light guide includes a first reflective wall disposed on the upper surface of the circuit board, and a second reflective wall disposed on the upper surface of the circuit board such that a space, in which the point light sources are disposed, is defined between the first reflective wall and the second reflective wall.

BRIEF DESCRIPTION OF THE DRAWINGS

Details of the embodiments will be more clearly understood from the following detailed description taken in conjunction with the accompanying drawings, in which.

DETAILED DESCRIPTION OF EMBODIMENTS

Figure 1:
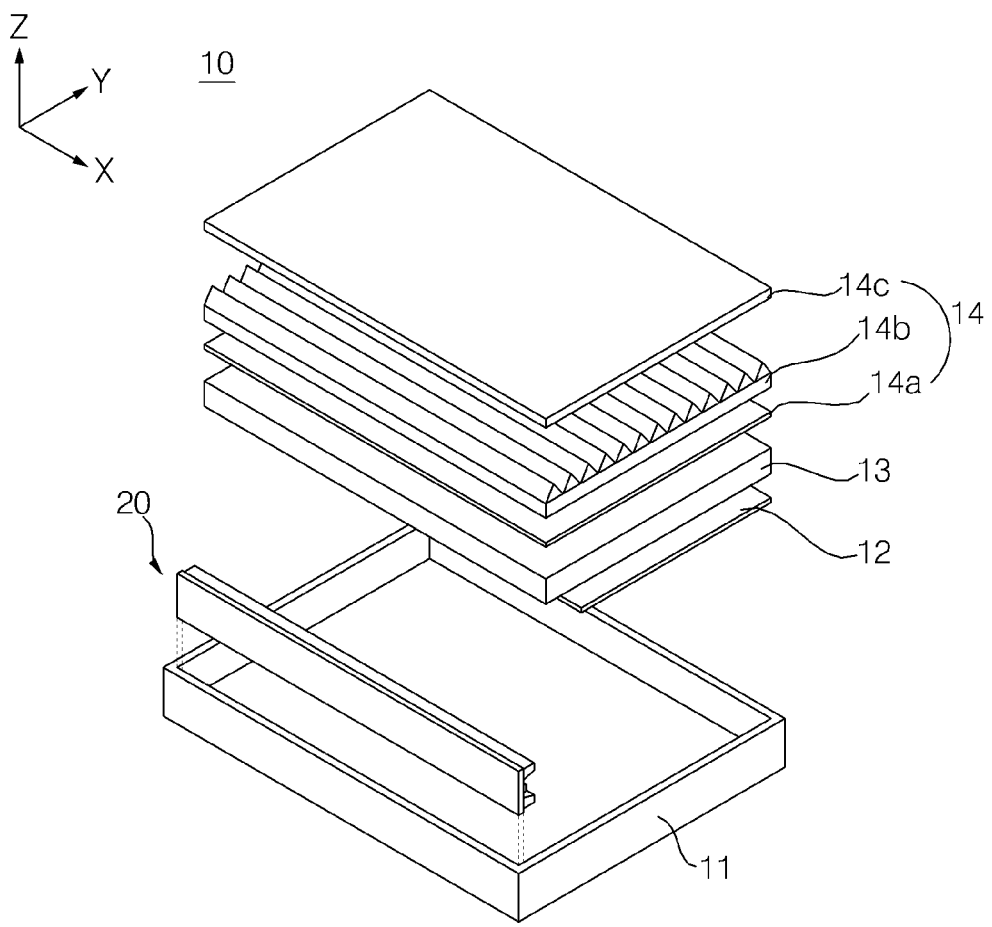
FIG. 1 is an exploded perspective view showing a planar light source device according to an embodiment.

Reference will now be made in detail to embodiments, examples of which are illustrated in the accompanying drawings. However, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims. In certain embodiments, detailed descriptions of device constructions or processes well known in the art may be omitted to avoid obscuring appreciation of the disclosure by a person of ordinary skill in the art. Wherever possible, the same reference numbers will be used throughout the drawings to refer to the same or like parts.

Spatially relative terms such as "below", "beneath", "lower", "above", or "upper" may be used herein to describe one element's relationship to another element as illustrated in the Figures. It will be understood that spatially relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each layer is exaggerated, omitted, or schematically illustrated for convenience of description and clarity. Also, the size or area of each constituent element does not entirely reflect the actual size thereof.

Angles or directions used to describe the structures of light-emitting devices according to embodiments are based on those shown in the drawings. Unless there is, in the specification, no definition of a reference point to describe angular positional relationships in the structures of the light-emitting devices, the associated drawings may be referred to.

Figure 2:
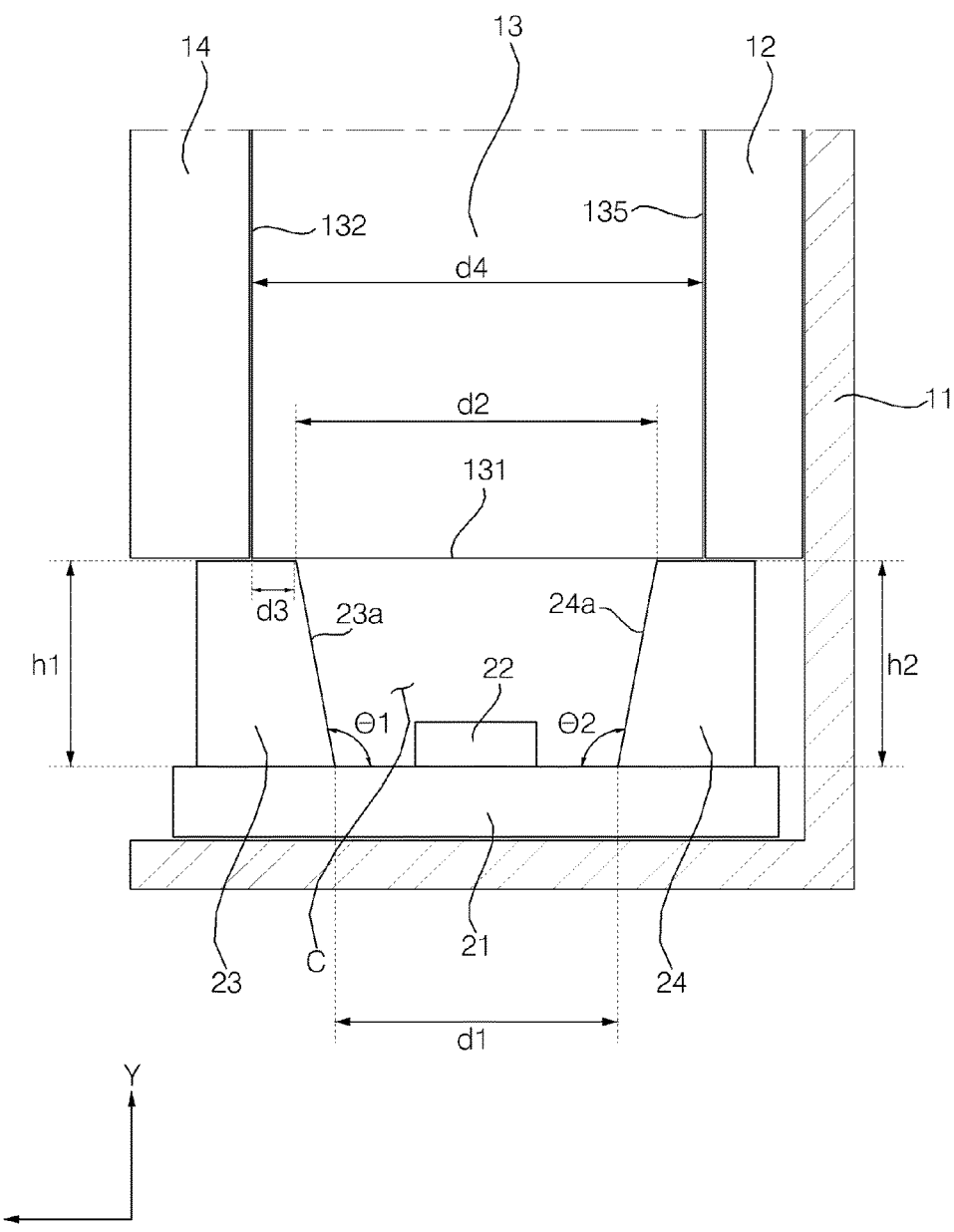
FIG. 2 is a cross-sectional view showing the planar light source device according to the embodiment.

FIG. 1 is an exploded perspective view showing a planar light source device according to an embodiment. FIG. 2 is a cross-sectional view showing the planar light source device according to the embodiment.

Referring to FIGS. 1 and 2, the planar light source device 10 of the embodiment includes a light source module for providing light and a light guide plate 13, the light guide plate 13 having a light introduction surface 131 for receiving light from the light source module 20 and a light emission surface 132, which has a larger area than the light introduction surface 13 and emits the light.

First, the Z-axis illustrated in the drawings may be referred to as "the front". The X-axis illustrated in the drawings may be referred to as "the horizontal direction" or "the longitudinal direction". The Y-axis illustrated in the drawings may be referred to as "the upward direction".

The light guide plate 13 serves to diffuse and propagate the light introduced from the point light source of the light source module 20. That is, the light guide plate 13 may cause introduced point light to have even brightness, and may convert the introduced point light into planar light so that the planar light is emitted outward through the light emission surface 132.

For example, the light guide plate 13 may be made of a transparent material or a hollow metal pipe, into which light propagates. Specifically, the light guide plate 13 may be fabricated and used in a flat type or a wedge type using polymethylmethacrylate (PMMA) or a transparent acryl resin, may be formed of a glass material, or may include a plastic lens, although the disclosure is not limited thereto.

In particular, referring to FIG. 2, the light guide plate 13 may take the form of a plate having 132 light emission surface 132, from which planar light is emitted, a light-reflecting surface 135 opposite the light emission surface 132, and four side surfaces connecting the light emission surface 132 and the light-reflecting surface 135 to each other. However, the form of the light guide plate 13 is not limited thereto. In addition, in another embodiment, light may be emitted from the front and rear sides of the light guide plate 13 (both ends in the Z-axis direction).

The light-reflecting surface 135 of the light guide plate 13, which constitutes the rear surface of the light guide plate 13, performs total forward (Z-axis) reflection of the light introduced from the point light sources 22 through the light introduction surface 131.

For example, the light-reflecting surface 135 may be formed in such a manner as to provide a resin material with an aluminum layer imparted with excellent reflectivity through chemical vapor deposition, the aluminum layer being provided or not provided with a plurality of randomly arranged protrusions. The protrusions serve to reflect light, introduced from the point light sources 22, in various directions.

The front surface of the light guide plate 13, i.e. the light emission surface 132, is forwardly spaced apart from the light-reflecting surface 135. The space between the light emission surface 132 and the light-reflecting surface 135 may be filled with air. The light emission surface 132 and the light-reflecting surface 135 are arranged parallel to each other in consideration of the efficient propagation of light.

Specifically, the light emission surface 132 may include a regular reflector pattern. The light emission surface 132 may downwardly reflect some of the light introduced through the light introduction surface 131 from the point light sources 22 so as to transmit the light in the direction opposite the light introduction surface 131. The remaining light, introduced through the light introduction surface 131 from the point light sources 22, may be forwardly emitted from the light guide plate 13 through the light emission surface 132.

The light introduction surface 131 is a space which is located between the light-reflecting surface 135 and the light emission surface 132 so as to receive light from the point light sources 22 of the light source module 20.

For example, as shown in FIG. 2, the light introduction surface 131 may be disposed on one side surface of the light guide plate 13, and may be made of a transparent material so as to be open. In particular, the area of the light introduction surface 131 is smaller than the area of the light emission surface 132.

In another example, the light guide plate 13 may be formed of a light transmissive material, and may be configured so as to inwardly propagate the light introduced through the light introduction surface 131 of the light guide plate 13 using the difference in the index of refraction between the light guide plate 13 and the outside.

In addition, the planar light source device 10 may further include at least one optical sheet 14, disposed in front of the light guide plate 13 so as to concentrate and diffuse the light directed from the light guide plate 13, and at least one reflector sheet 12 at the rear of the light guide plate 13.

In addition, the planar light source device 10 may further include a bottom cover 11 disposed below the light guide plate 13, the bottom cover 11 being configured to receive the light guide plate 13 and the light source module 20 therein.

Although the reflector sheet 12 may be disposed at the rear of the light guide plate 13, the disclosure is not limited thereto. The reflector sheet 12 may enhance light transmission efficiency by reflecting the light, generated from the light source module 20, forward from the light guide plate 13.

The optical sheet 14 serves to concentrate and diffuse the planar light introduced from the light guide plate 13. For example, the optical sheet 14 may include a diffuser film 14a which includes diffuser particles such as, for example, beads, to diffuse the light introduced from the light guide plate 13 toward a liquid crystal display panel (in the forward direction), a prism film 14b which has a prism pattern to concentrate light in front of the diffuser film 14a, and a protector film 14c which covers the entire surface of the prism film 14b to protect the prism film 14b. However, the disclosure is not limited thereto.

The optical sheet 14 may diffuse and concentrate the light, emitted from the light source module 20 and guided by the light guide plate 13, so as to achieve the required brightness and viewing angle.

The diffuser film 14a may realize even brightness by scattering and concentrating the light coming from the light source module 20 or the light returning from the prism film 14b. The diffuser film 14a may have a thin sheet shape and may be formed of a transparent resin. For example, the diffuser film 14a may be formed by coating a polycarbonate or polyester film with a light-scattering or light-concentrating resin. However, the disclosure is not limited thereto.

The prism film 14b is acquired by forming a vertical or horizontal prism pattern on the surface of an optical film, and serves to concentrate light output from the diffuser film 14a.

The prism pattern of the prism film 14b may be formed to have a triangular cross section in order to improve the light concentration efficiency thereof. The optimum brightness may be accomplished when a right-angled prism having an apex angle of 90 degrees is used.

The protector film 14c may cover the upper surface of the prism film 14b in order to protect the prism film 14b.

The light generated from the light source module 20 may be efficiently introduced into the light guide plate 13 only when a constant distance is maintained between the light guide plate 13 and the light source module 20. In particular, in response to the recent trend toward planar light sources having reduced thickness, the light source module 20 is required to provide light that is uniform in the longitudinal direction of the light guide plate 13.

Figure 3:
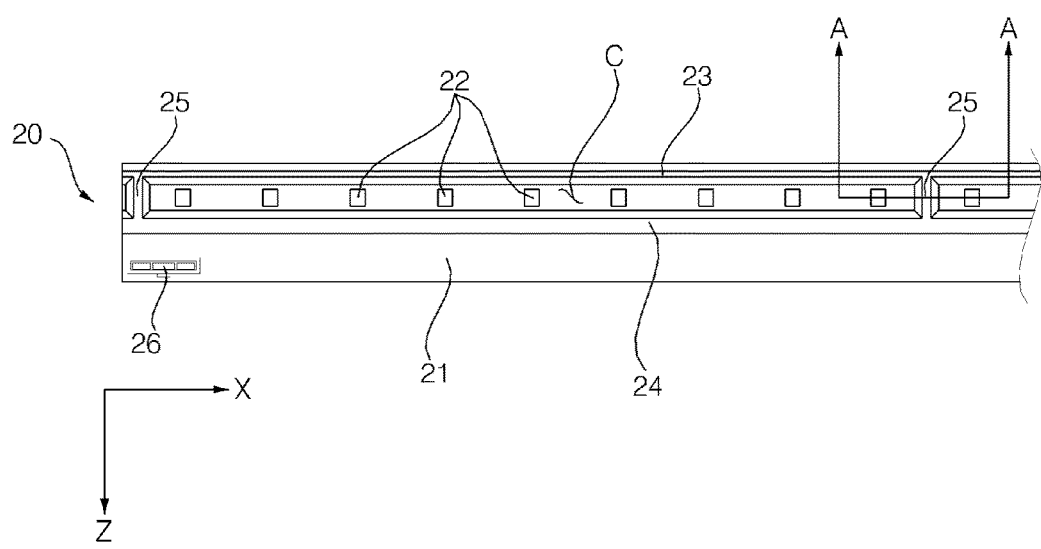
FIG. 3 is a plan view showing a light source module according to the embodiment.

FIG. 3 is a plan view showing the light source module according to the embodiment.

Referring to FIGS. 1 to 3, the light source module 20 serves to generate light and provide the light to the light guide plate 13.

For example, the light source module 20 includes a plurality of point light sources 22 for generating light, the circuit board 21 on which the point light sources 22 are mounted, and a light guide for guiding the light generated from the point light sources 22.

The point light sources 22 may include any of various components capable of generating light. For example, the point light sources 22 are light sources capable of emitting point-shaped light. The point light sources 22 may include semiconductor diodes such as light-emitting diodes or laser diodes.

Specifically, as shown in FIG. 3, the point light sources 22 may be of a chip-on-board type, in which light-emitting diodes are mounted on a circuit board 21. However, the disclosure is not limited thereto.

Although the point light sources 22 may be colored light-emitting diodes which emit light having a color such as red, green, blue, white or the like, or ultra violet (UV) light-emitting diodes which emit ultraviolet light, the disclosure is not limited thereto. The light source module 20 may further include a fluorescent body (not shown) for converting the wavelength of light generated from the point light sources 22 into light having a white wavelength. The fluorescent body is disposed so as to surround the point light sources 22.

In addition, the point light sources 22 may be arranged in a single row or in multiple rows. Specifically, the point light sources 22 may be composed of light emitting elements adapted to emit red, green and blue colored light, which are alternately arranged.

More specifically, the point light sources 22 may be repeatedly arranged at a constant pitch in the longitudinal direction of the light introduction surface 131 of the light guide plate 13 (in the x-axis direction). The point light sources 22 are preferably arranged in a single row in the direction parallel to the longitudinal direction of the light introduction surface 131 of the light guide plate 13.

Light generated from the point light sources 22 is emitted in a radial fashion around the light-projecting direction. The light-projecting direction of the point light sources 22 is typically perpendicular to the light introduction surface 131.

The circuit board 21 serves to provide a space on which the point light sources 22 are disposed and to support the point light sources 22. For example, the circuit board 21 may include an electrode pattern (not shown) having electrical conductivity, and an insulative body which surrounds the electrode pattern and has an opening portion (not shown) through which a portion of the electrode pattern is exposed. The point light sources 22 are electrically connected to the electrode pattern. The circuit board 21 is provided with a connector 26, which is electrically connected to an external power supply. The connector serves to electrically connect the circuit board 21 and the external power supply to each other.

The body of the circuit board 21 may include a material having an electrical insulation property. For example, the body of the circuit board 21 may be formed of FR-4, or may include at least one of polyimide, liquid crystal polymer, polyester, polyethylene naphthalate (PEN), polyethylene terephthalate (PET) and liquid crystal polymer (LCP), but the disclosure is not limited thereto. The circuit board 21 may be a typical printed circuit board (PCB), a metal core PCB, a flexible PCB, a ceramic PCB or the like.

The circuit board 21 is disposed so as to face the light introduction surface 131 of the light guide plate 13. Specifically, the upper surface of the circuit board 21 is positioned so as to face the light introduction surface 131 of the light guide plate 13 in a state of being parallel to the light introduction surface 131. The circuit board 21 has a larger size than at least the light introduction surface 131 of the light guide plate 13. In other words, the circuit board 21 is positioned so as to overlap the light introduction surface 131 of the light guide plate 13.

The circuit board 21 may be further provided on the upper surface thereof with a reflective layer (not shown), which serves to reflect light introduced into the upper surface of the circuit board 21. For example, the reflective layer may be formed of a reflective material, which is applied to the entire upper surface of the circuit board 21.

For example, the reflective layer may include at least one of silver (Ag), aluminum (Al), a silver (Ag) alloy, and an aluminum (Al) alloy. In another example, the reflective surfaces may be configured such that layers having different indices of refraction are alternately and repeatedly stacked one on another. However, the reflective layer is not limited thereto.

Here, the point light sources 22 are arranged on the upper surface of the circuit board 21 in the longitudinal direction of the circuit board 21 (i.e. in the x-axis direction or in the longitudinal direction of the light introduction surface 131).

The light guide serves to guide the light, emitted from the point light sources 22, in the upward direction of the circuit board 21. Furthermore, the light guide serves to guide the light, emitted from the point light sources 22, from the circuit board 21 to the light introduction surface 131 of the light guide plate 13.

The light guide includes a first reflective wall 23 disposed on the upper surface of the circuit board 21, and a second reflective wall 24 disposed on the upper surface of the circuit board 21 so as to define a space C, in which the point light sources 22 are located, between the first reflective wall 23 and the second reflective wall 24.

Specifically, when the Y-Z cross-section is viewed, the first reflective wall 23, the second reflective wall 24, the upper surface of the circuit board 21, and the light introduction surface 131 of the light guide plate 13 define a closed space, and the point light sources 22 are located in the closed space.

More specifically, the first reflective wall 23 and the second reflective wall 24 are arranged in the longitudinal direction of the circuit board 21. The first reflective wall 23 and the second reflective wall 24 have a length corresponding to the length of the light introduction surface 131 and are arranged parallel to each other.

The first reflective wall 23 and the second reflective wall 24 support the light guide plate 13 to prevent the light guide plate 13 from coming into contact with the point light sources 22 and to maintain the distance between the point light sources 22 and the light guide plate 13. In addition, the first reflective wall 23 and the second reflective wall 24 reflect the light introduced from the point light sources 22. The reflective walls may be formed of a resin material.

The first reflective wall 23 and the second reflective wall 24 cause the point light sources 22 and the light guide plate 13 to be spaced apart from each other, in order to prevent the light guide plate 13 from being deformed by the heat generated from the point light sources 22. Thus, at least one of the heights h1 and h2 of the first reflective wall 23 and the second reflective wall 24 is greater than the height of the point light sources 22. In other words, both the heights h1 and h2 of the first reflective wall 23 and the second reflective wall 24 may be greater than the height of the point light sources 22.

The light introduction surface 131 of the light guide plate 13 is supported by at least one of the upper portion of the first reflective wall 23 and the upper portion of the second reflective wall 24. Specifically, the front end of the light introduction surface 131 of the light guide plate 13 is supported by the upper portion of the first reflective wall 23, and the rear end of the light introduction surface 131 is supported by the upper portion of the second reflective wall 24. The width d3 of the portion of the light introduction surface 131 of the light guide plate 13 that is supported by the first reflective wall 23 or the second reflective wall 24 preferably exceeds 0.01 mm.

The first reflective wall 23 and the second reflective wall 24 are provided with reflective surfaces to reflect the light generated from the point light sources 22. The reflective surfaces may include at least one of silver (Ag), aluminum (Al), a silver (Ag) alloy, and an aluminum (Al) alloy. In another example, the reflective surfaces may be configured such that layers having different indices of refraction are alternately and repeatedly stacked one on another.

The reflective surfaces include a first reflective surface 23a formed on one surface of the first reflective wall 23 to reflect light, and a second reflective surface 24a formed on one surface of the second reflective wall 24 to reflect light.

The first reflective surface 23a and the second reflective surface 24a are arranged so as to face each other with the point light sources 22 interposed therebetween. The first reflective surface 23a and the second reflective surface 24a are configured so as to be parallel to each other. The space defined by the first reflective surface 23a and the second reflective surface 24a vertically overlaps the light introduction surface 131 of the light guide plate 13.

The reflective surfaces serve to increase the amount of light that undergoes total reflection at the boundary of the light guide plate 13 when the light from the point light sources 22 is introduced through the light introduction surface 131 of the light guide plate 13. Accordingly, the light guide has to cause the light to be introduced into the light introduction surface 131 in a direction parallel to the light emission surface 132 of the light guide plate 13, or to ensure that the angle between the light emission surface 132 and the light introduced into the light introduction surface 131 is small.

Therefore, particularly referring to FIG. 13, when the Y-Z cross section is viewed, the distance between the first reflective surface 23a and the second reflective surface 24a may increase in at least some region with increasing distance from the bottom. Providing the reflective surfaces with the above-described shape may cause the light, generated from the point light sources 22, to be introduced into the light emission surface 131 of the light guide plate 13 in a direction approximately parallel to the light emission surface 132 of the light guide plate 13, which may reduce the loss of light inside the light guide plate 13.

Specifically, the first reflective surface 23a and the second reflective surface 24a may be configured such that the distance therebetween increases with increasing distance upward from the bottom. In other words, the first reflective surface 23a and the second reflective surface 24a may be configured such that the distance therebetween increases in the direction from the circuit board 21 toward the light guide plate 13.

The width d2 between the upper end of the first reflective surface 23a and the upper end of the second reflective surface 24a may be smaller than the width d4 of the light introduction surface 131 of the light guide plate 13. The width d2 between the upper end of the first reflective surface 23a and the upper end of the second reflective surface 24a may be within a range from 90% to 95% of the width d4 of the light introduction surface 131 of the light guide plate 13. If the width d2 between the upper end of the first reflective surface 23a and the upper end of the second reflective surface 24a is less than 90% of the width d4 of the light introduction surface 131 of the light guide plate 13, hot spots may be generated on the light emission surface 132 at positions close to the light introduction surface 131. If the width d2 between the upper end of the first reflective surface 23a and the upper end of the second reflective surface 24a exceeds 95% of the width d4 of the light introduction surface 131 of the light guide plate 13, the reflective walls 23 and 24 may have difficulty supporting the light introduction surface 131 of the light guide plate 13.

In addition, the width d2 between the upper end of the first reflective surface 23a and the upper end of the second reflective surface 24a is greater than the width d1 between the lower end of the first reflective surface 23a and the lower end of the second reflective surface 24a.

The reflective surfaces may be flat or curved. In addition, the shapes of the first reflective surface 23a and the second reflective surface 24a may be configured to be symmetrical with each other, or may be different. The first reflective surface 23a and the second reflective surface 24a may be oriented at an angle that is perpendicular or oblique relative to the upper surface of the circuit board 21. Here, the first reflective surface 23a and the second reflective surface 24a may have the same angle or different angles relative to the upper surface of the circuit board 21.

FIG. 2 illustrates an example in which each of the first reflective surface 23a and the second reflective surface 24a has a flat surface, and the first reflective surface 23a and the second reflective surface 24a have the same angle relative to the upper surface of the circuit board 21. Various configurations of the reflective surfaces other than the above-mentioned configuration will be described later.

Figure 4:
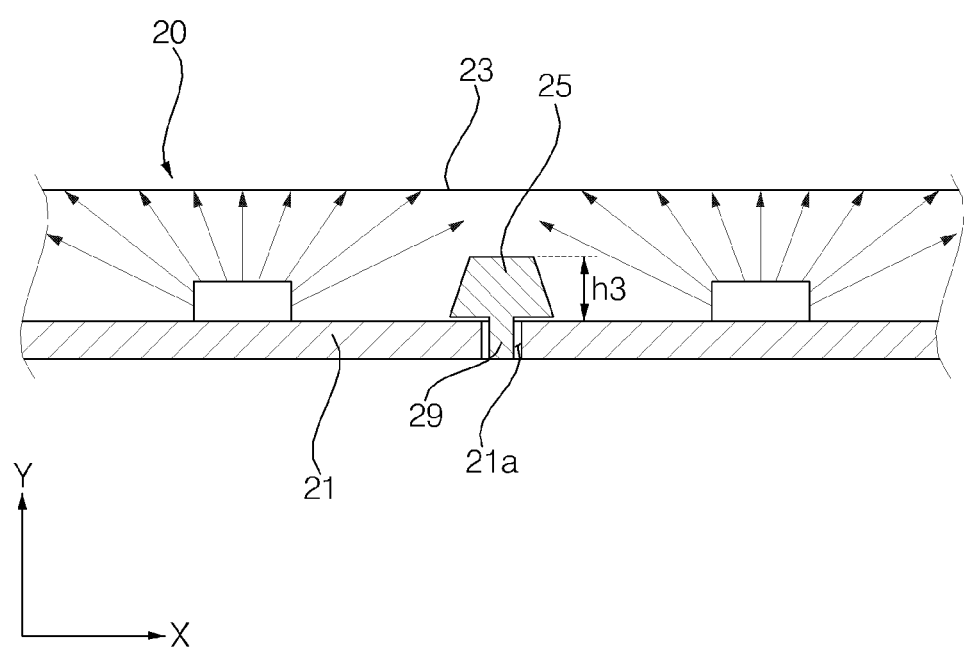
FIG. 4 is a cross-sectional view of the light source module shown in FIG. 3, which is taken along line A-A.

FIG. 4 is a cross-sectional view of the light source module shown in FIG. 3, which is taken along line A-A.

Referring to FIG. 4, the light source module 20 further includes bridges 25 configured to connect the first reflective wall 23 and the second reflective wall 24 to each other.

The bridges 25 serve to prevent bending which may occur when the first reflective wall 23 and the second reflective wall 24 are long so as to maintain a constant distance between the first reflective wall 23 and the second reflective wall 24, thereby allowing the first reflective wall 23 and the second reflective wall 24 to be integrally coupled to the circuit board 21.

Each of the bridges 25 has one end connected to the first reflective wall 23 and the other end connected to the second reflective wall 24. The bridges 25 may be repeatedly arranged at a constant pitch in the longitudinal direction of the circuit board 21. The bridges 25 are located between the point light sources 22, which are arranged in the longitudinal direction of the circuit board 21.

Although the height h3 of the bridges 25 is not limited, in order to allow the light generated from the point light sources 22 to be emitted in the longitudinal direction of the light introduction surface 131 without restriction, the height h3 of the bridges 25 is preferably lower than those of the first reflective wall 23 and the second reflective wall 24.

In order to reflect the light introduced into the bridges 25, a reflective material for reflecting light may be applied to the outer surfaces of the bridges 25. Here, the reflective material is the same material as that of the above-described reflector layer.

In addition, although the shape of the bridges 25 is not limited, each bridge 25 is preferably configured such that the width of the bridge is gradually reduced with increasing distance upward from the bottom (i.e. in the direction from the circuit board 21 toward the light guide plate 13). The bridges 25 are disposed on the upper surface of the circuit board 21.

The light guide may further include coupling protrusions 29, which are fitted into respective coupling holes 21a formed in the circuit board 21. The coupling protrusions 29 serve to position the coupling locations and to provide holding force when the light guide is coupled to the circuit board 21. The light guide may be coupled to the circuit board 21 by means of a bonding material.

The coupling protrusions 29 include at least two coupling protrusions in order to prevent rotation and displacement of the light guide. Specifically, the coupling protrusions 29 protrude from the bottom of the light guide. More specifically, the coupling protrusions 29 may protrude from the bottom of the bridges 25.

Figure 5A:
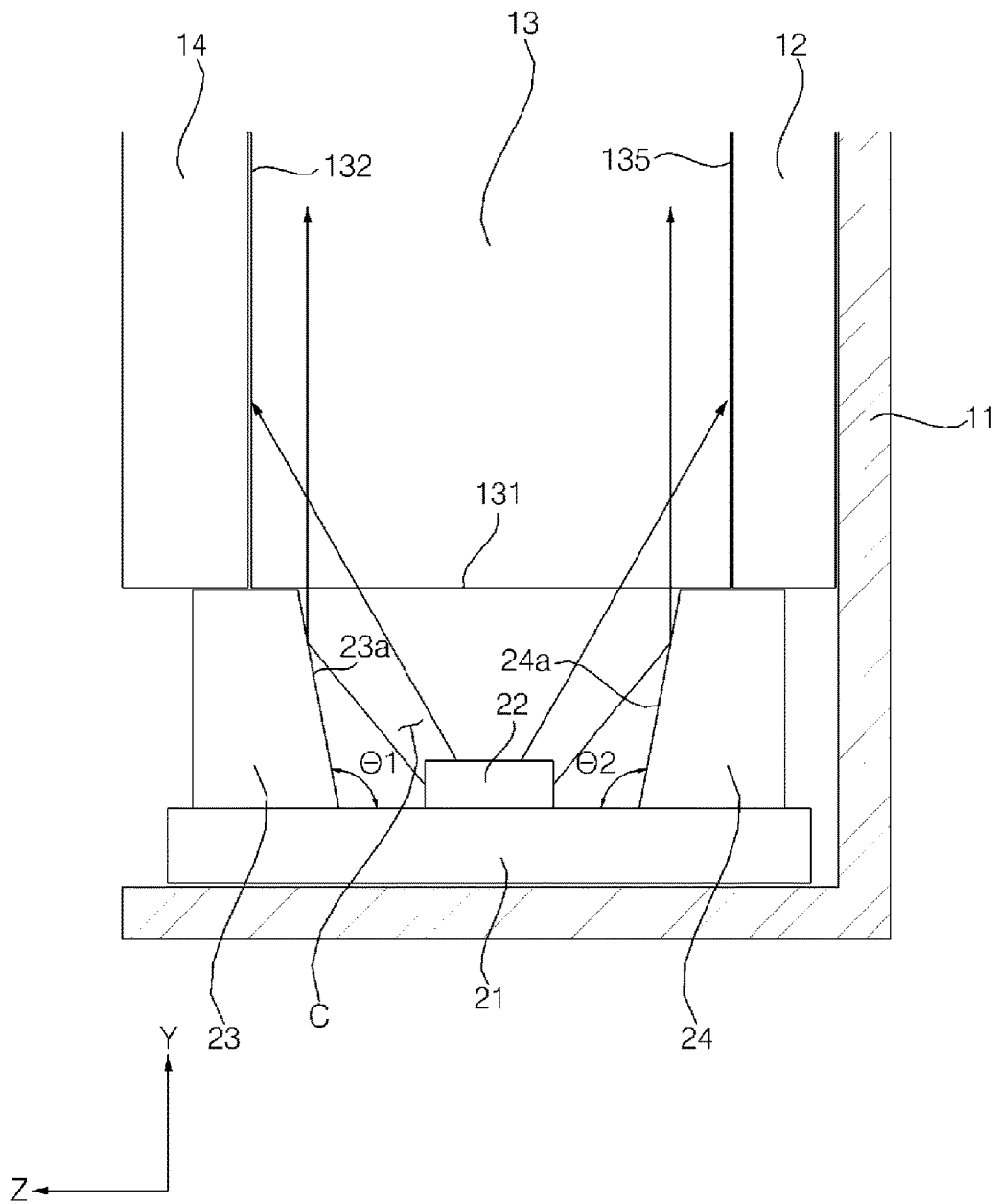
FIG. 5A is a schematic cross-sectional view of a light travelling path of the planar light source device, along the Y-Z cross section.

FIG. 5A is a schematic cross-sectional view of a light travelling path of the planar light source device, along the Y-Z cross section. Referring to FIG. 5A, the distance between the first reflective surface 23a and the second reflective surface 24a increases in at least a portion thereof with increasing distance upward from the bottom, and light generated from the point light sources 22 is thus introduced into the light introduction surface 131 of the light guide plate 13 at an angle approximately parallel to the light emission surface 132 of the light guide plate 13. Accordingly, when the light generated from the point light sources 22 is introduced into the light introduction surface 131 of the light guide plate 13 at an angle approximately parallel to the light emission surface 132 of the light guide plate 13, it is possible to reduce the loss of light in the light guide plate 13.

Figure 5B:
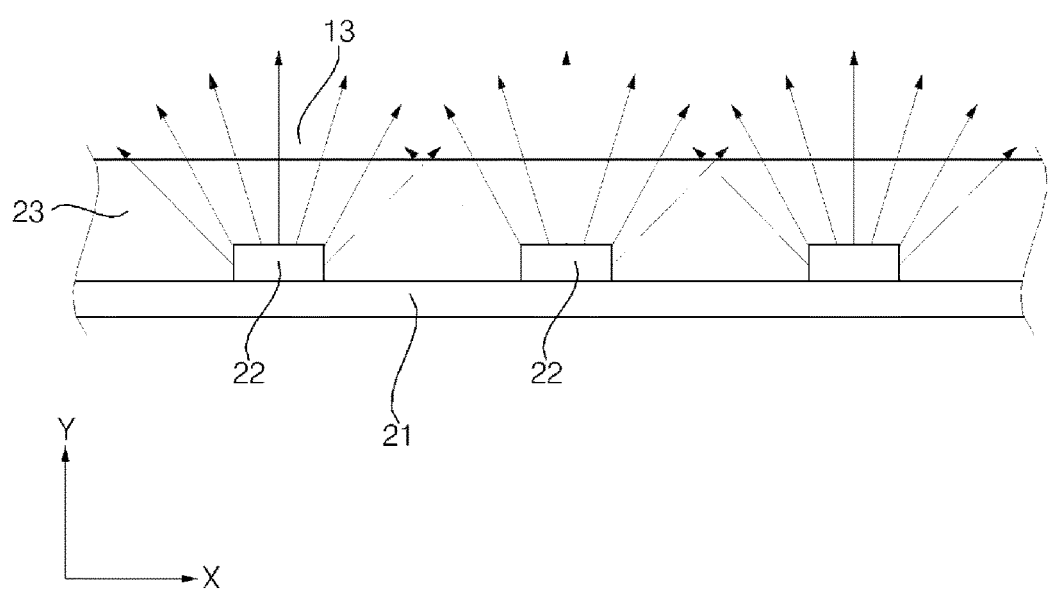
FIG. 5B is a schematic cross-sectional view of a light travelling path of the planar light source device, along the X-Y cross section.

FIG. 5B is a schematic cross-sectional view of a light travelling path of the planar light source device, along the X-Y cross section.

Referring to FIG. 5B, the space defined by the first reflective surface 23a and the second reflective surface 24a extends in the longitudinal direction of the light introduction surface 131, and the point light sources 22 are arranged on the upper surface of the circuit board 21 in a chip-on-board fashion, thereby allowing light generated from the point light sources 22 to be efficiently emitted in the longitudinal direction of the light introduction surface 131. Consequently, light generated from the plurality of point light sources 22 is emitted in the longitudinal direction of the light introduction surface 131 in a fashion similar to a planar light source. Accordingly, the light may be uniformly introduced into the light introduction surface 131 of the light guide plate 13 from the plurality of point light sources 22.

FIGS. 6A to 6G are views showing light guides according to various embodiments. The light guides shown in FIGS. 6A to 6G are modifications of the light guide shown in FIG. 2, and a description of configurations that are identical to those shown in FIG. 2 is omitted.

Figure 6A:
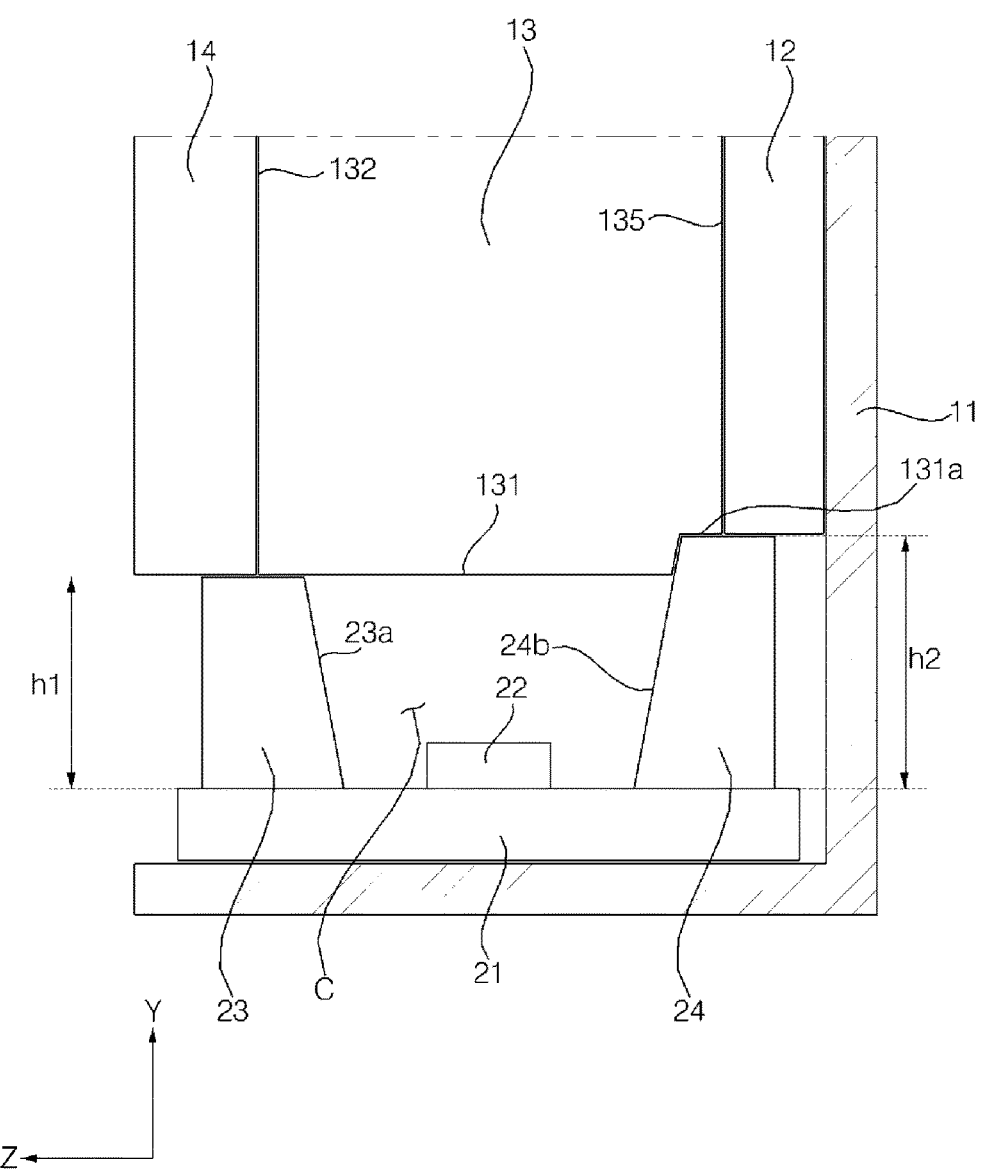
FIGS. 6A to 6G are views showing light guides according to various embodiments.

Referring to FIG. 6A, the light guide according to another embodiment is configured such that height of the first reflective wall 23 is different from that of the second reflective wall 24. In this embodiment, any of the height of the first reflective 23 and the height of the second reflective wall 24 is also greater than the height of the point light sources 22.

The light introduction surface 131 of the light guide plate 13 includes a stepped portion 131a, which is recessed or protruded therefrom. The stepped portion 131a mates with the upper portion of the first reflective wall 23 or the second reflective wall 24 so as to position the light guide plate 13 with respect to the light source module 20.

In this embodiment, the height h2 of the second reflective wall 24 is greater than the height h1 of the first reflective wall 23.

Figure 6B:
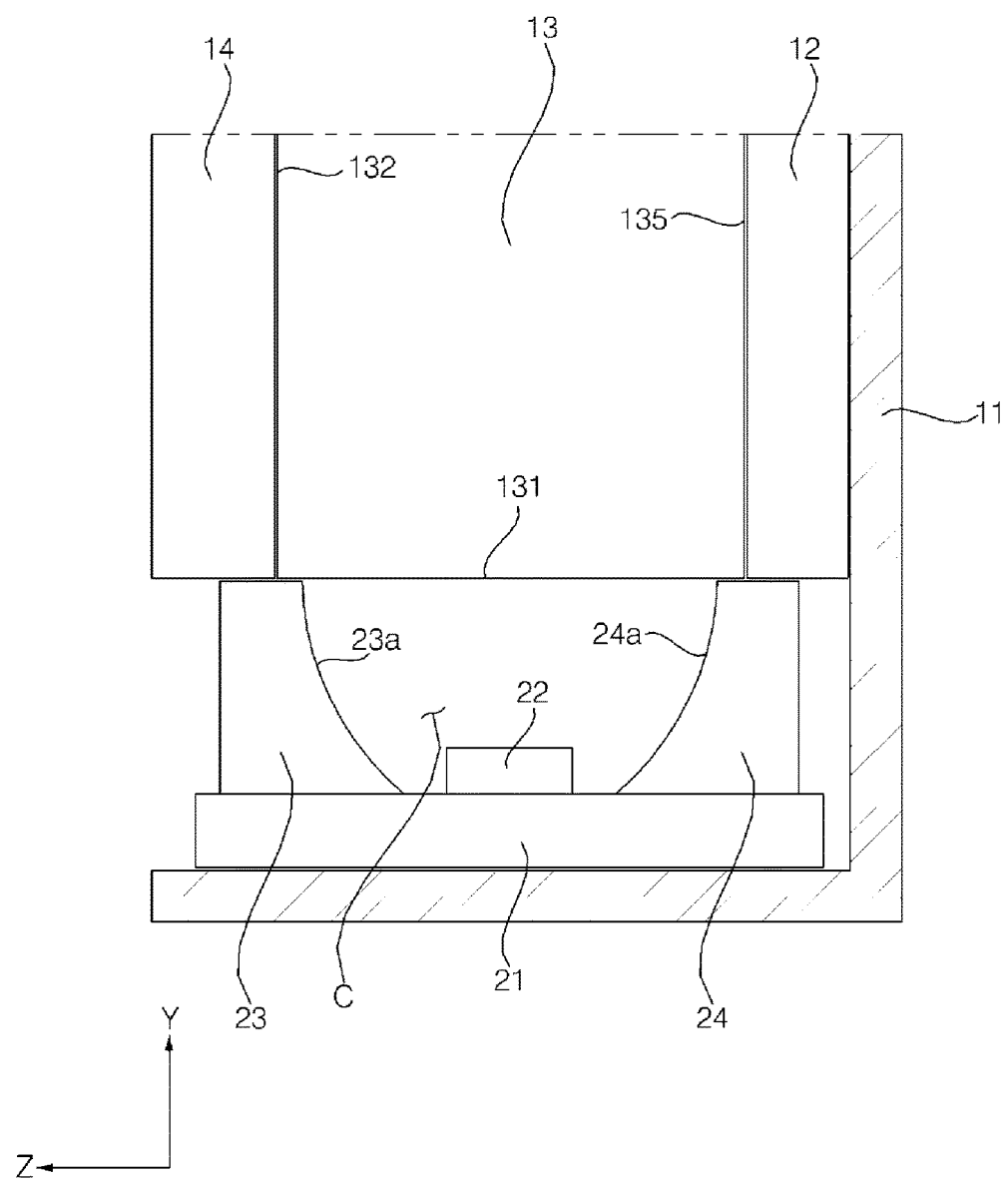

Referring to FIG. 6B, a further embodiment differs from the embodiment shown in FIG. 2 in terms of the shapes of the first reflective surface 23a and the second reflective surface 24a.

The first reflective surface 23a and the second reflective surface 24a are curved. Specifically, the first reflective surface 23a and the second reflective surface 24a define aspherical or spherical surfaces, which have the centers of curvature positioned directly above the point light sources 22.

Consequently, most of the light generated from the point light sources 22, positioned below the center of curvature, is introduced in a direction approximately parallel to the light emission surface 132 of the light guide plate 13 with the result that the efficiency of the light guide plate 13 is improved.

Figure 6C:
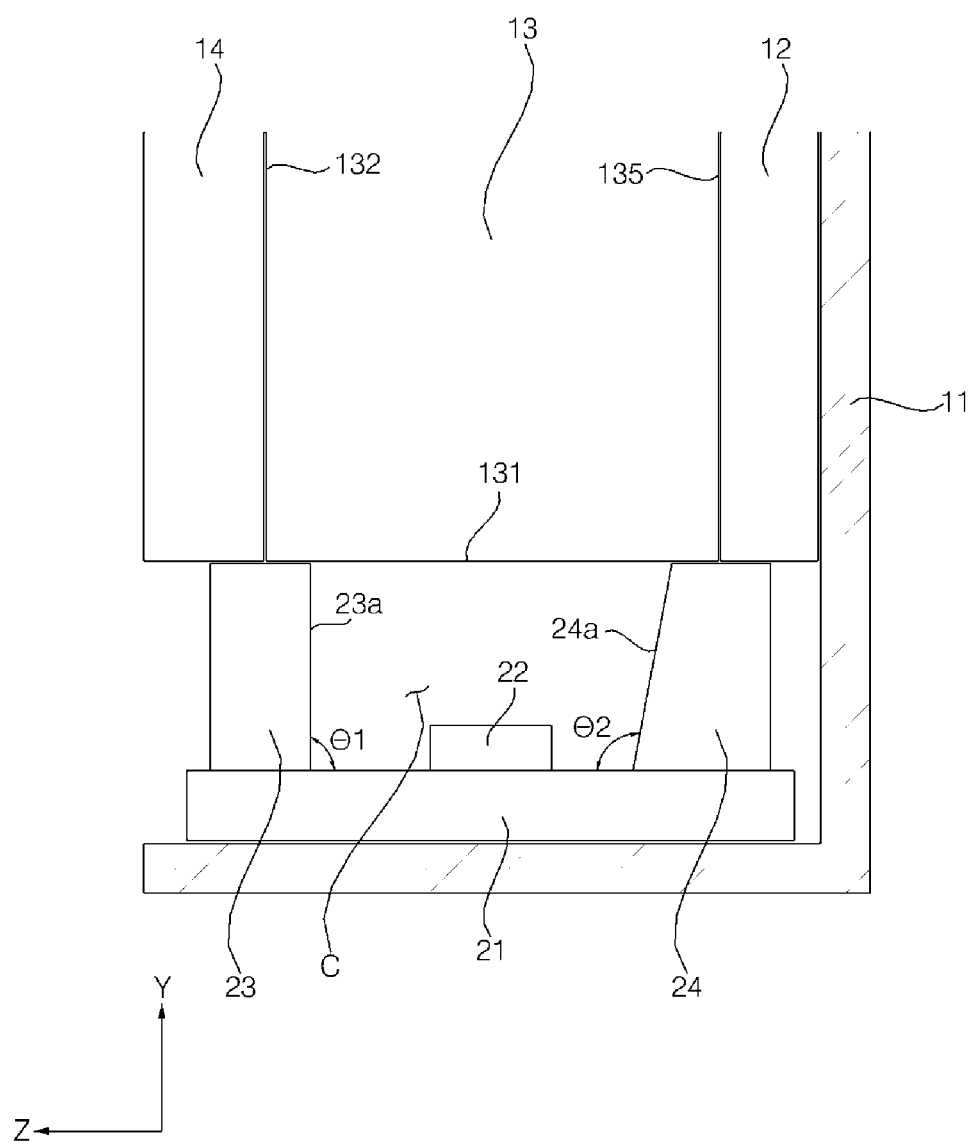

Referring to FIG. 6C, a further embodiment differs from the embodiment shown in FIG. 2 in terms of the shape of the first reflective surface 23a. In other words, the first reflective surface 23a and the second reflective surface 24a have angle of inclination that are different from each other. Specifically, the angle of inclination Θ1, defined between the first reflective surface 23a and the upper surface of the circuit board 21, is a right angle, whereas the angle of inclination Θ2, defined between the second reflective surface 24a and the upper surface of the circuit board 21, is greater than a right angle.

Figure 6D:
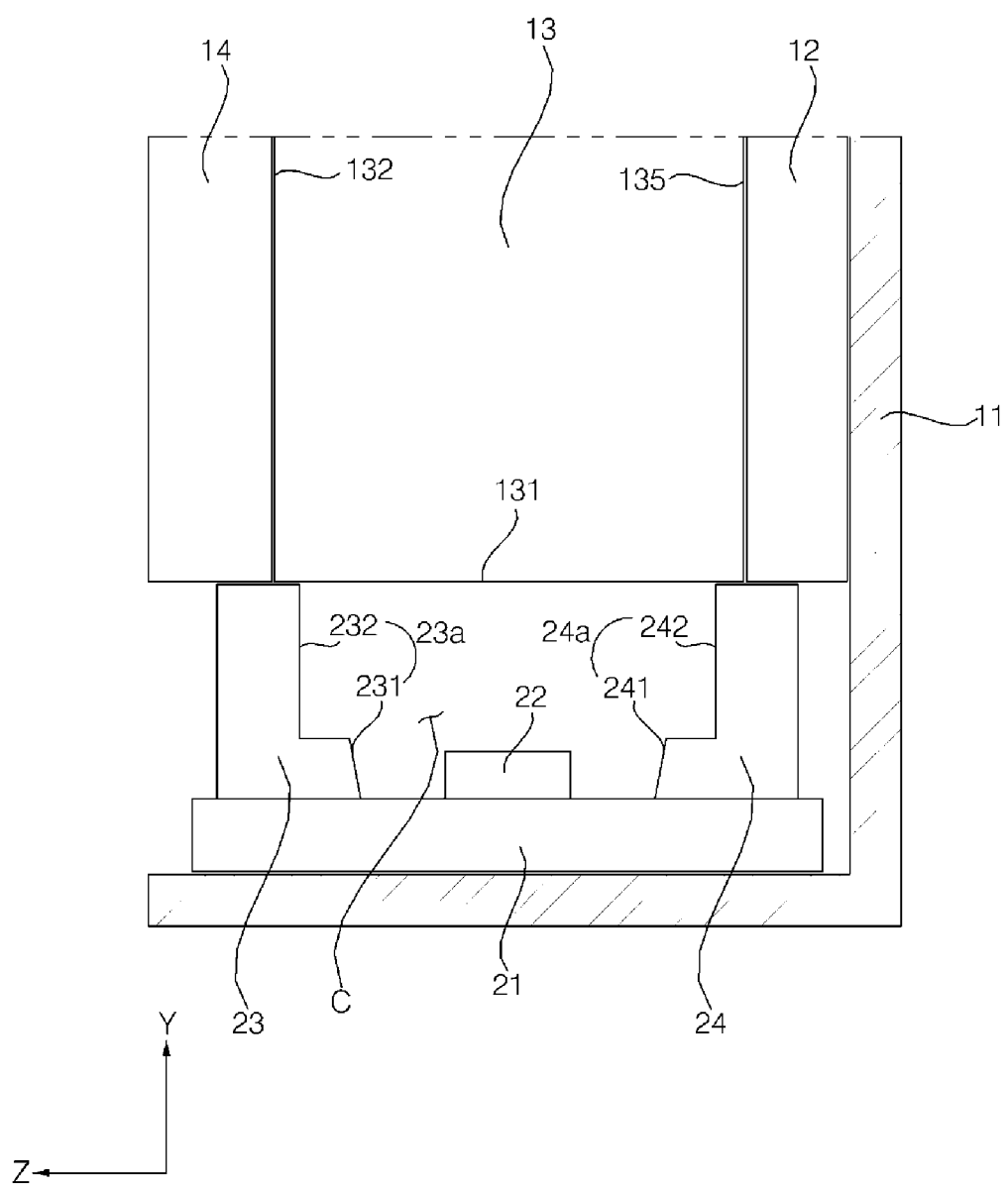

Referring to FIG. 6D, a further embodiment differs from the embodiment shown in FIG. 2 in terms of shapes of the first reflective surface 23a and the second reflective surface 24a. In this embodiment, the first reflective surface 23a and the second reflective surface 24a have shapes that are symmetrical to each other.

Specifically, the distance between the lower section 231 of the first reflective surface 23a and a lower section 241 of the second reflective surface 24a increases with increasing distance toward the light guide plate 13 from the circuit board 21, and the distance between the upper section 232 of the first reflective surfaces 23a and the upper section 242 of the second reflective surface 24a is constant.

A height of the lower sections 231 and 241 of the first and second reflective surfaces 23a and 24a may be equal to or greater than the height of the point light sources 22.

Figure 6E:
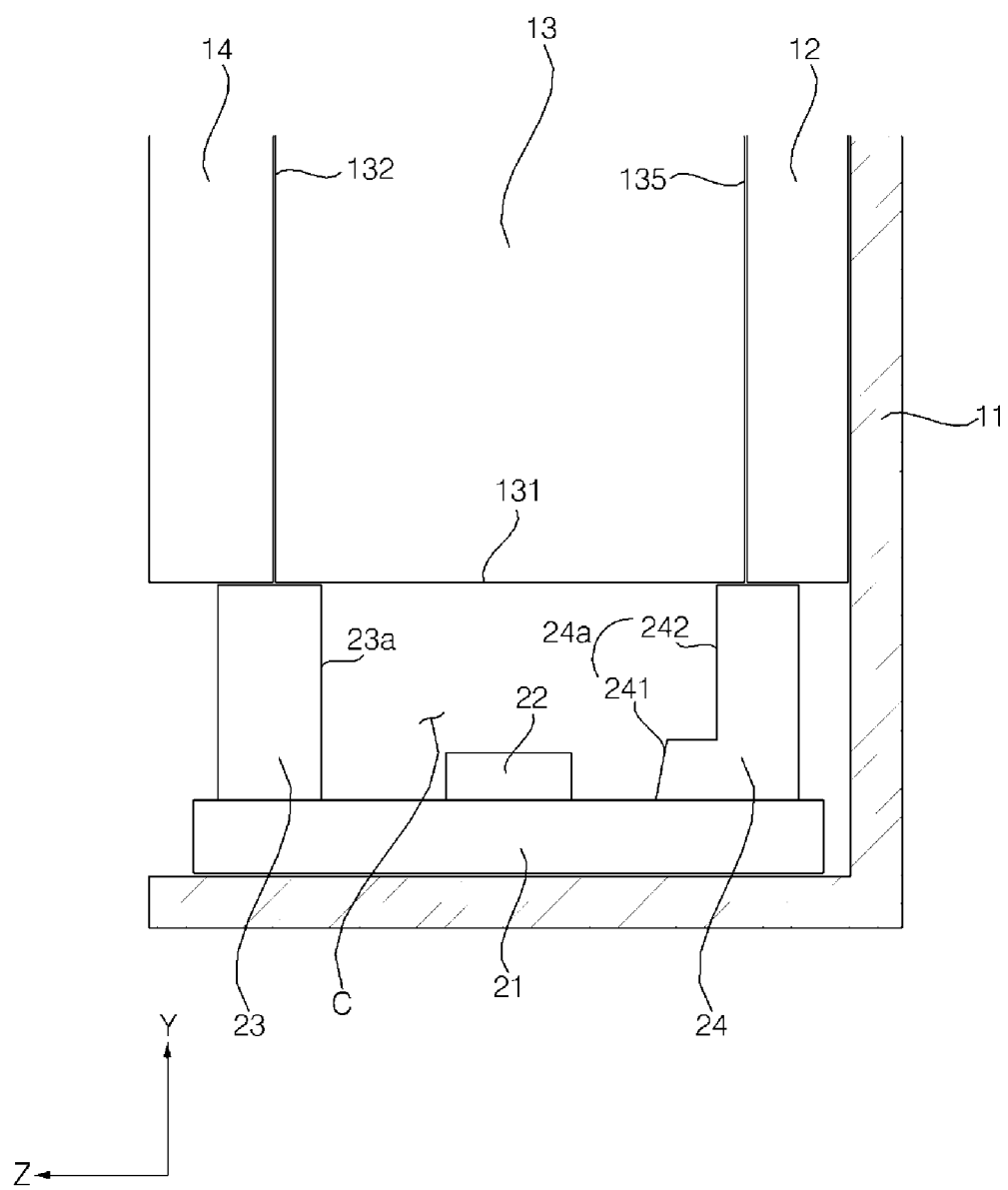

Referring to FIG. 6E, a further embodiment differs from the embodiment shown in FIG. 6D in terms of the shape of the first reflective surface 23a. In this embodiment, the first and second reflective surfaces 23a and 24a have shapes that are different from each other. Although the second reflective surface 24a of this embodiment is identical to the second reflective surface 24a of the embodiment shown in FIG. 6D, the first reflective surface 23a of this embodiment has an angle of inclination perpendicular to the upper surface of the circuit board 21, unlike the embodiment shown in FIG. 6D.

Figure 6F:
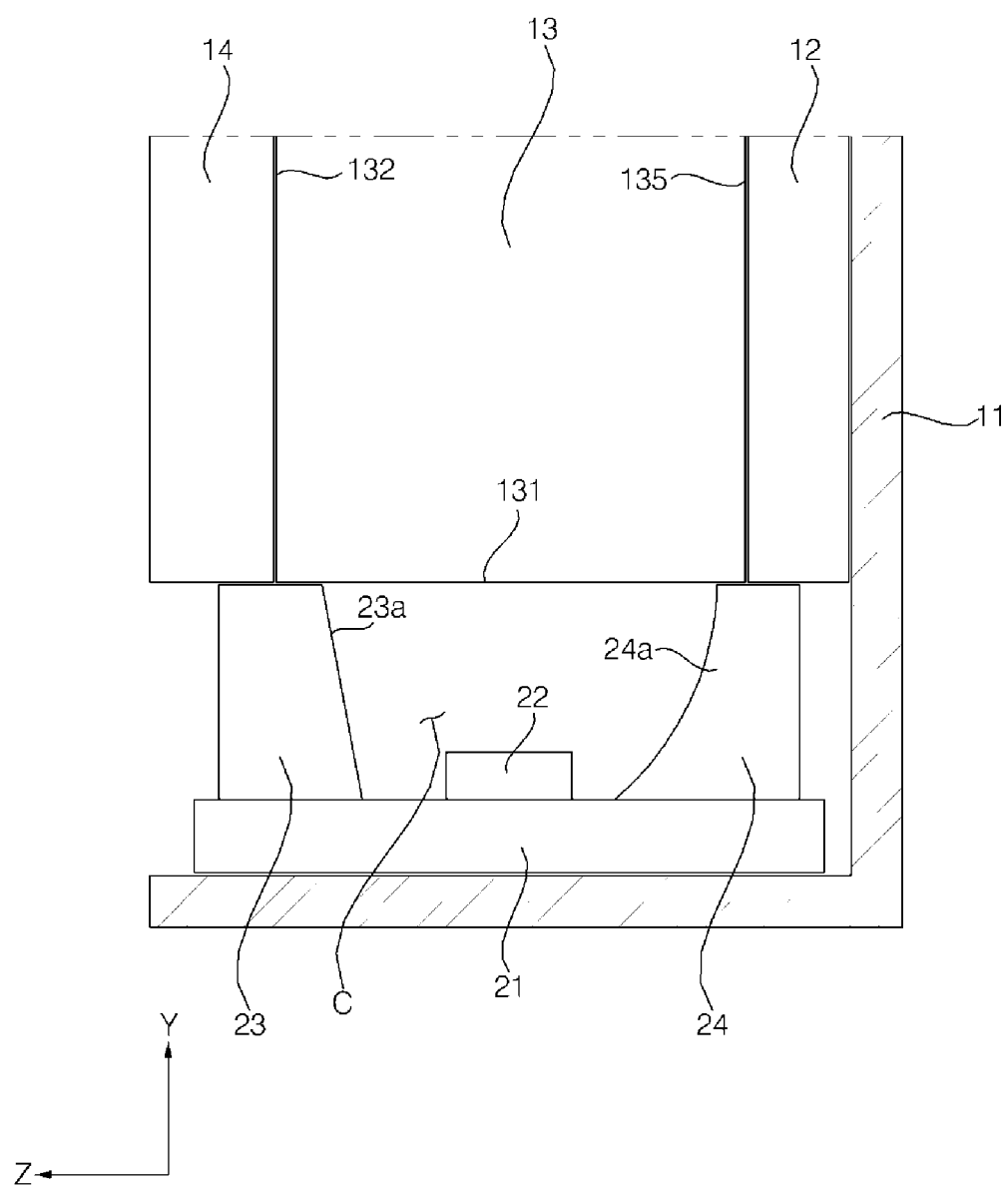

Referring to FIG. 6F, a further embodiment differs from the embodiment shown in FIG. 2 in terms of the shape of the second reflective surface 24a. In this embodiment, one of two reflective surfaces has a flat surface and the other of the two reflective surfaces has a curved surface.

The distance between the first reflective surface 23a and the second reflective surface 24a increases with increasing distance from the circuit board 21 toward the light guide plate 13. The first reflective surface 23a is flat whereas the second reflective surface 24a is curved.

Figure 6G:
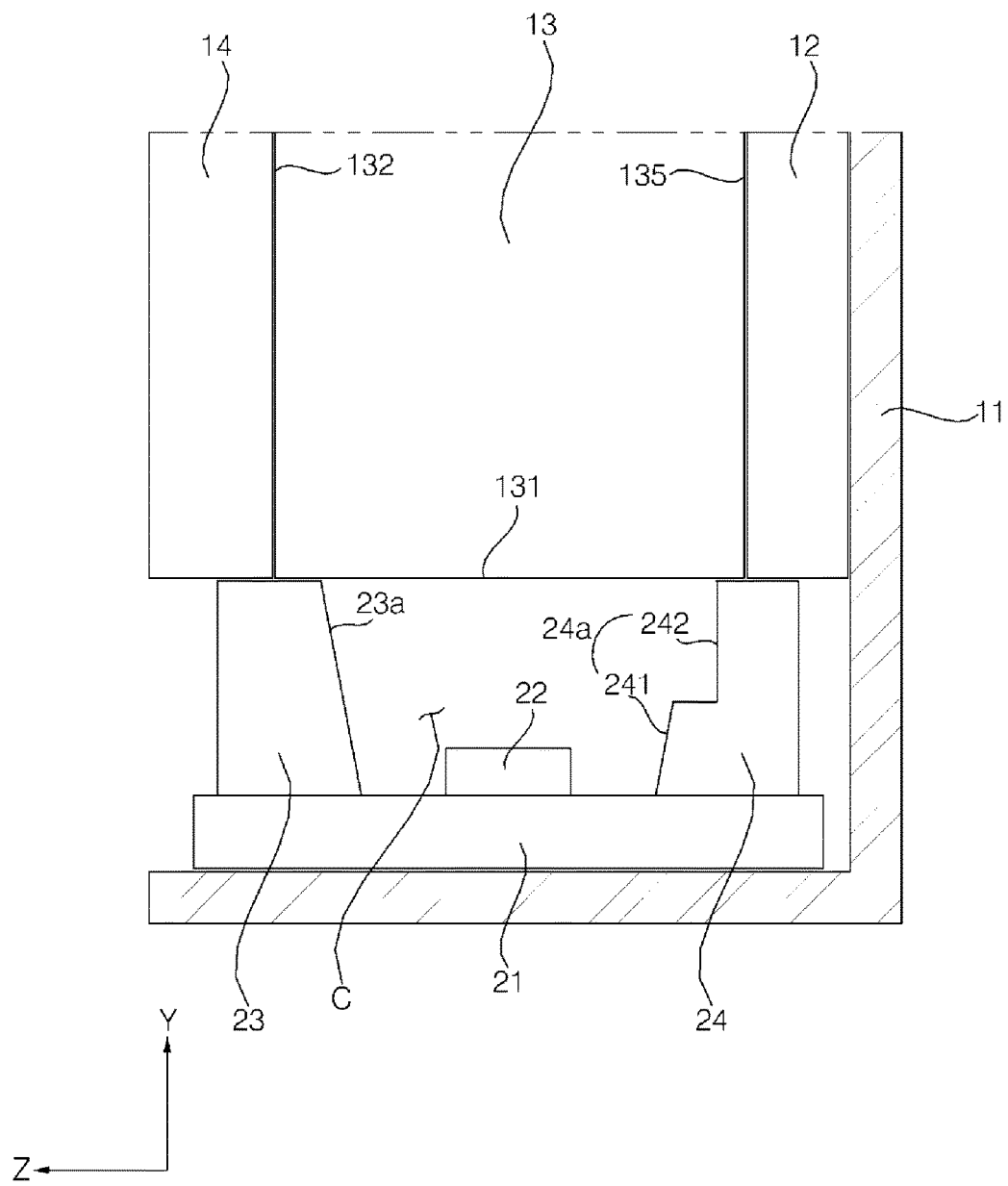

Referring to FIG. 6G, a further embodiment differs from the embodiment shown in FIG. 6D in terms of the shape of the first reflective surface 23a. In this embodiment, the first and second reflective surfaces 23a and 24a have shapes that are different from each other. Although the second reflective surface 24a of this embodiment is identical to the second reflective surface 24a of the embodiment shown in FIG. 6D, the first reflective surface 23a of this embodiment has an angle of inclination that is greater than a right angle unlike the embodiment shown in FIG. 6D. The height of the lower section 241 of the second reflective surface 24a may be equal to or greater than the height of the point light sources 22.

Figure 7:
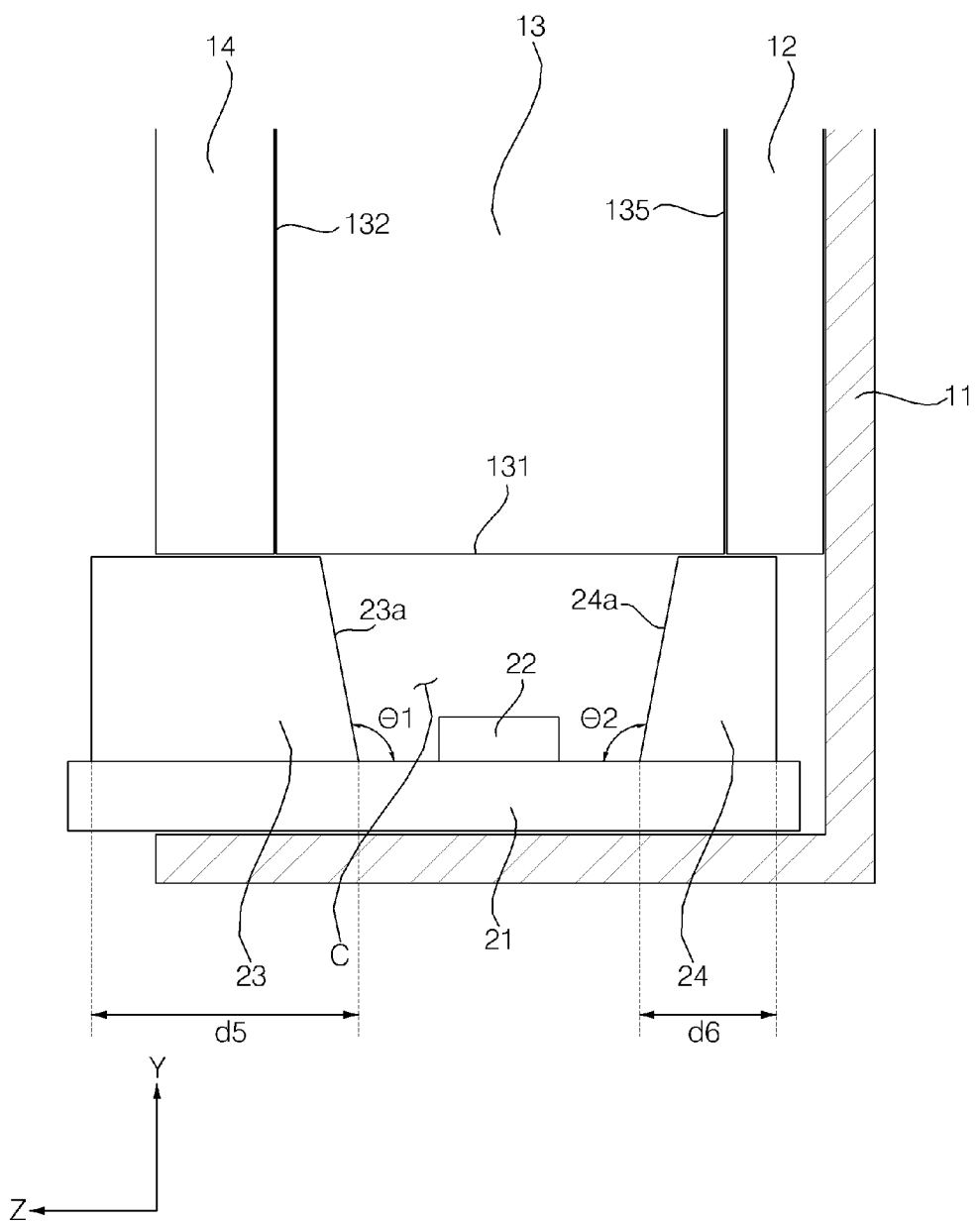
FIG. 7 is a cross-sectional view illustrating the planar light source device according to another embodiment.

FIG. 7 is a cross-sectional view showing a planar light source device according to a further embodiment. Referring to FIG. 7, the planar light source device of this embodiment differs from that of the embodiment shown in FIG. 2 in terms of the configuration of the light source module 20.

When the point light sources 22 are disposed on the upper surface of the circuit board 21, the point light sources 22 may eccentrically deviate to one side from the center due to the presence of the connectors 26. In this embodiment, one of two reflective walls has a greater width than the other of the two reflective walls. Increasing the width of one of two reflective walls may contribute to an increase in the rigidity of the light guide and prevent distortion of the light guide.

Specifically, the point light sources 22 may eccentrically deviate to one side in the width direction of the circuit board 21 (in the z-axis direction). The first reflective wall 23 has a greater width d5 than the second reflective wall 24. As a matter of course, the widths of the upper and lower ends of the first reflective wall 23 are greater than those of the upper and lower ends of the second reflective wall 24.

The light guide plate 13 and the optical sheet 14 may be disposed on the upper end of the first reflective wall 23, which has an increased width and may be stably supported thereby.

According to the embodiments, since hot spots, which occur between the point light sources of the light source module, are reduced, there is an advantage of enhancing the efficiency with which light is introduced into the light guide plate from the light source module.

Furthermore, according to the embodiments, since it is not necessary to perform an additional process of packaging the point light sources, there are advantages of reduced manufacturing costs and manufacturing time.

In addition, according to the embodiments, since the reflective walls maintain a uniform distance between the light guide plate and the point light sources, there is an advantage of preventing the light guide plate from being deformed by heat generated from the point light sources.

Figure 8:
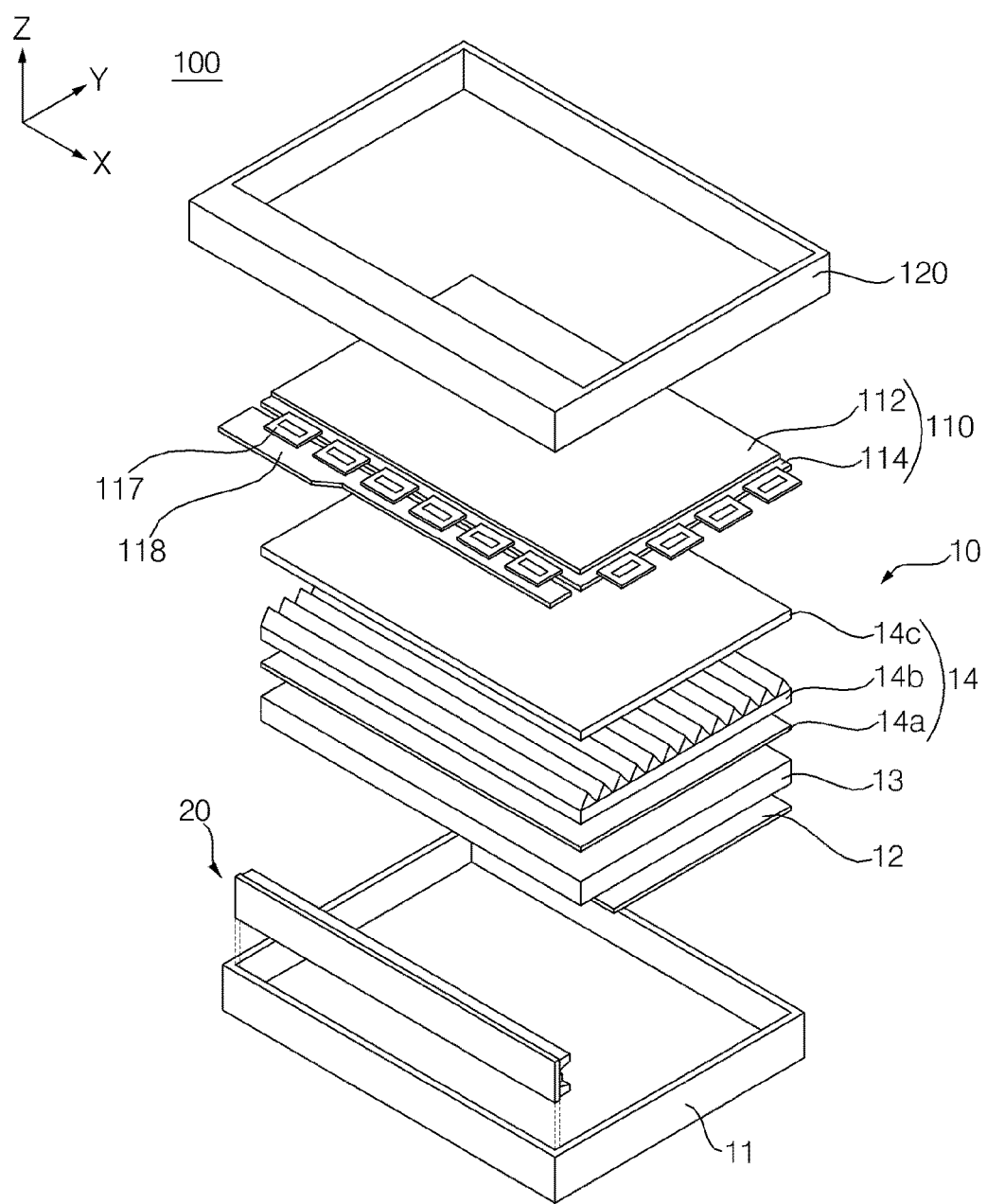
FIG. 8 is an exploded perspective view showing a liquid crystal display apparatus including the planar light source device.
Figure 9:
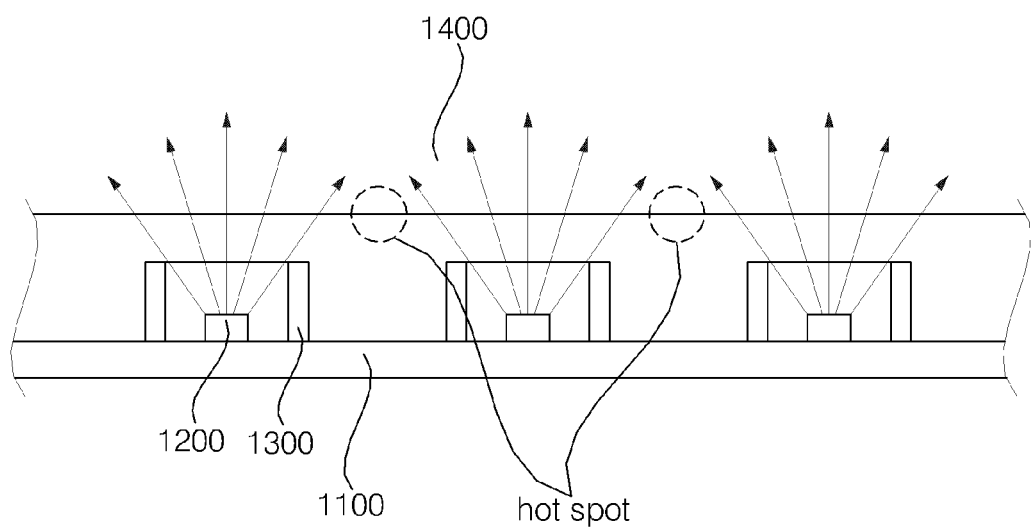
FIG. 9 is a cross-sectional view showing a planar light source device according to the related art.
Figure 10:
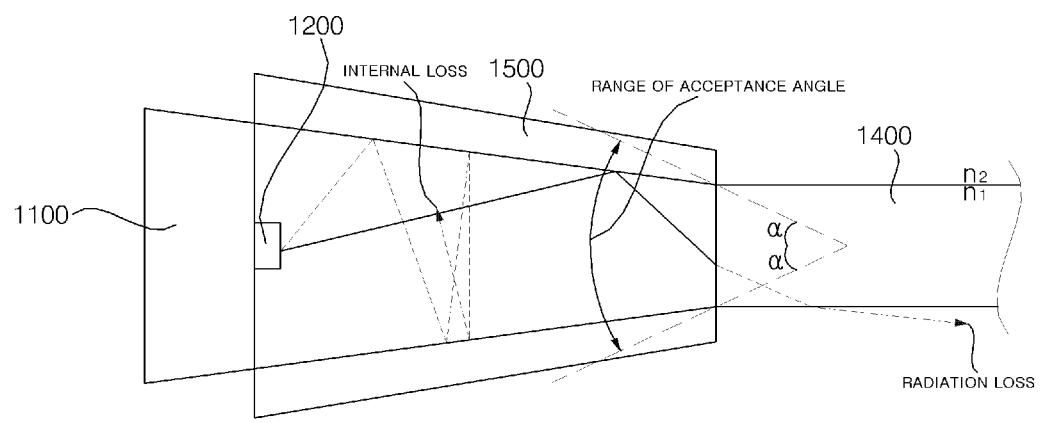
FIG. 10 is a view illustrating a light guide which decreases in width with increasing distance toward a light guide plate.

FIG. 8 is an exploded perspective view showing a liquid crystal display apparatus including the planar light source device.

Referring to FIG. 8, the liquid crystal display apparatus 100 of the embodiment may include a liquid crystal display panel 110, which displays an image, and the planar light source device 10, which supplies light to the liquid crystal display panel 110.

The liquid crystal display panel 110 may display an image using the light provided from the planar light source device 10. The liquid crystal display panel 110 may include a color filter substrate 112 and a thin film transistor substrate 114 which are opposite each other with liquid crystals interposed therebetween.

The color filter substrate 112 may realize the color of the image displayed on the liquid crystal display panel 110.

The thin film transistor substrate 114 is electrically connected to a printed circuit board 118, on which a plurality of circuit components are mounted, via a drive film 117. The thin film transistor substrate 114 may apply a drive voltage, provided from the printed circuit board 118, to the liquid crystals in response to a drive signal provided from the printed circuit board 118.

The thin film transistor substrate 114 may include thin film transistors and pixel electrodes formed on a transparent substrate formed of, for example, glass or plastic.

Accordingly, through the use of the planar light source device 10 of the embodiment, the liquid crystal display apparatus 100 may achieve good light uniformity and may prevent the generation of hot spots at the edge portion thereof.

Although embodiments have been described with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A planar light source device comprising:
a light source module;
a light guide plate having a light introduction surface into which light from the light source module is introduced, and a light emission surface which has a larger surface area than the light introduction surface and from which light is emitted;
a stepped portion formed by recessing a part of the light introduction surface of the light guide plate;
an optical sheet disposed in front of the light guide plate; and
a reflector sheet disposed behind the light guide plate;
wherein the light source module comprises:
a circuit board;
at least two point light sources, which are electrically connected to the circuit board and are arranged on an upper surface of the circuit board in a longitudinal direction of the circuit board; and
a light guide for guiding light, which is introduced from the point light sources, in an upward direction of the circuit board,
wherein the light guide comprises:
a first reflective wall disposed on the upper surface of the circuit board; and
a second reflective wall disposed on the upper surface of the circuit board such that a space, in which the point light sources are disposed, is defined between the first reflective wall and the second reflective wall,
wherein the point light sources eccentrically deviate to one side in a width direction of the circuit board,
wherein the second reflective wall has a greater height than the first reflective wall,
wherein the stepped portion mates with an upper portion of the second reflective wall,
wherein the first reflective wall supports a portion of the light introduction surface positioned lower than the stepped portion, the first reflective wall supports a lower surface of the optical sheet positioned lower than the stepped portion, wherein the second reflective wall supports a lower surface of the reflector sheet positioned higher than the lower surface of the optical sheet.

2. The planar light source device according to claim 1, wherein the light introduction surface of the light guide plate is supported by at least one of the first reflective surface and the second reflective surface.

3. The planar light source device according to claim 1, wherein the first reflective wall has a first reflective surface formed on one side thereof so as to reflect light, and the second reflective wall has a second reflective surface formed on one side thereof so as to reflect light,
wherein the first reflective surface and the second reflective surface face each other with the point light sources disposed therebetween, and
wherein the light introduction surface of the light guide plate is supported by upper portions of the first and second reflective walls.

4. The planar light source device according to claim 1, wherein lengths of the first and second reflective walls are equal to a length of the light introduction surface of the light guide plate.

5. The planar light source device according to claim 1, further comprising a bridge, which is connected at one end thereof to the first reflective wall and at the other end thereof to the second reflective wall.

6. The planar light source device according to claim 3, wherein a distance between an upper end of the first reflective surface and an upper end of the second reflective surface is less than a width of the light introduction surface of the light guide plate.

7. The planar light source device according to claim 3, wherein a distance between the first reflective surface and the second reflective surface increases with increasing distance toward the light guide plate from the circuit board.

* * * * *